(12) United States Patent
Trewiler et al.

(10) Patent No.: US 8,516,674 B2
(45) Date of Patent: Aug. 27, 2013

(54) SOLID STATE RESISTANCE WELDING FOR AIRFOIL REPAIR AND MANUFACTURE

(75) Inventors: Gary Edward Trewiler, Loveland, OH (US); Stephen Joseph Ferrigno, Cincinnati, OH (US); Melvin Howard Wilkins, Milford, OH (US); Timothy Joseph Trapp, Cincinnati, OH (US); Matthew Stewart, Collingswood, NJ (US); Gregory Christopher Firestone, Pickerington, OH (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 12/827,159

(22) Filed: Jun. 30, 2010

(65) Prior Publication Data

US 2011/0005075 A1 Jan. 13, 2011

Related U.S. Application Data

(63) Continuation-in-part of application No. 10/713,493, filed on Nov. 14, 2003.

(51) Int. Cl.
*B23P 6/00* (2006.01)
*B23K 11/00* (2006.01)
*B23K 9/28* (2006.01)

(52) U.S. Cl.
USPC . 29/402.13; 29/889.1; 29/889.7; 29/889.712; 29/402.08; 219/78.02; 219/117.1; 219/93

(58) Field of Classification Search
USPC ............ 29/402.06, 402.08, 402.09, 402.11, 29/402.13, 889, 889.1, 889.7, 889.72, 889.721, 29/889.722; 219/78.01, 78.02, 93, 117.1; 228/119
See application file for complete search history.

(56) References Cited

U.S. PATENT DOCUMENTS 3,770,933 A * 11/1973 Holko et al. ............... 219/107
4,873,751 A * 10/1989 Walker et al. ............ 29/889.1

(Continued)

FOREIGN PATENT DOCUMENTS

| DE | 2319994 | 11/1974 |
| EP | 1533071 A2 | 5/2005 |
| FR | 2226241 A1 | 11/1974 |

OTHER PUBLICATIONS

"Resistance Welding", Subs Tech Substances & Technologies, Dr. Dmitri Kopeliovich, Apr. 23, 2010, 4 pages.

(Continued)

*Primary Examiner* — Sarang Afzali
(74) *Attorney, Agent, or Firm* — General Electric Company; Steven J. Rosen; David J. Clement

(57) ABSTRACT

A method for bonding airfoil sections includes aligning upper and stub airfoil sections having upper airfoil pressure and suction sides and stub airfoil pressure and suction sides respectively, pressing together upper and stub airfoil cross sections at upper and stub airfoil distal ends of the upper and stub airfoil sections respectively, and then resistance welding, preferably solid state resistance welding, the upper and stub airfoil sections together along the upper and stub airfoil cross sections by passing electrical current across the upper and stub airfoil cross sections. The upper and stub airfoil sections may be clamped between pressure and suction side upper airfoil electrodes and between the stub airfoil pressure and suction sides respectively. The method may be performed while the stub airfoil section is attached to an airfoil carrier such as a rotor disk rim, a gas turbine engine drum, or a gas turbine engine blade platform.

33 Claims, 13 Drawing Sheets

(56) References Cited

U.S. PATENT DOCUMENTS

| | | | |
|---|---|---|---|
| 4,883,216 A * | 11/1989 | Patsfall | 228/119 |
| 5,109,606 A | 5/1992 | DeMichael et al. | |
| 5,197,190 A | 3/1993 | Coolidge | |
| 6,438,838 B1 | 8/2002 | Meier et al. | |
| 6,568,077 B1 | 5/2003 | Hellemann et al. | |
| 6,616,408 B1 * | 9/2003 | Meier | 416/193 A |
| 6,666,653 B1 | 12/2003 | Carrier | |
| 6,933,459 B2 | 8/2005 | Helder et al. | |
| 6,964,557 B2 | 11/2005 | Helder et al. | |
| 7,416,393 B2 | 8/2008 | Richter | |
| 2003/0066192 A1 | 4/2003 | Wilkins et al. | |
| 2005/0102835 A1 | 5/2005 | Trewiler et al. | |
| 2006/0239823 A1 | 10/2006 | Mielke et al. | |
| 2009/0313823 A1 | 12/2009 | Rockstroh et al. | |

OTHER PUBLICATIONS

PCT Search Report and Written Opinion issued Sep. 29, 2011 in connection with corresponding Application No. PCT/US2011/039010.

\* cited by examiner

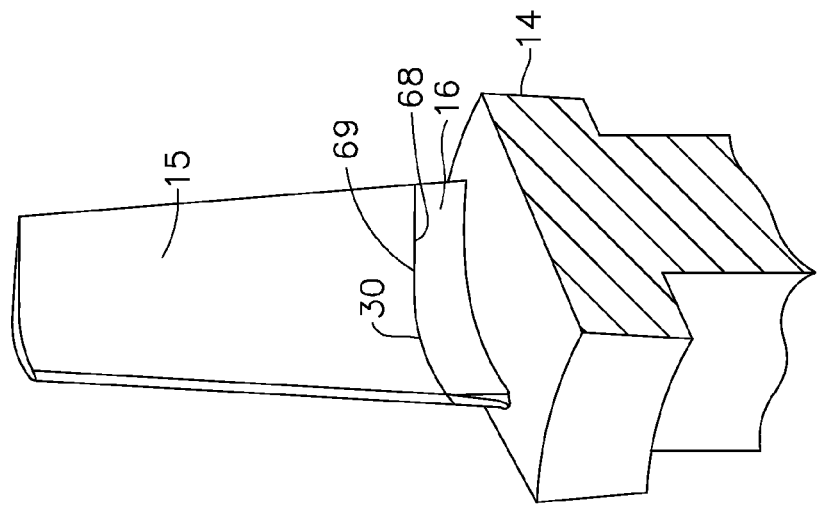
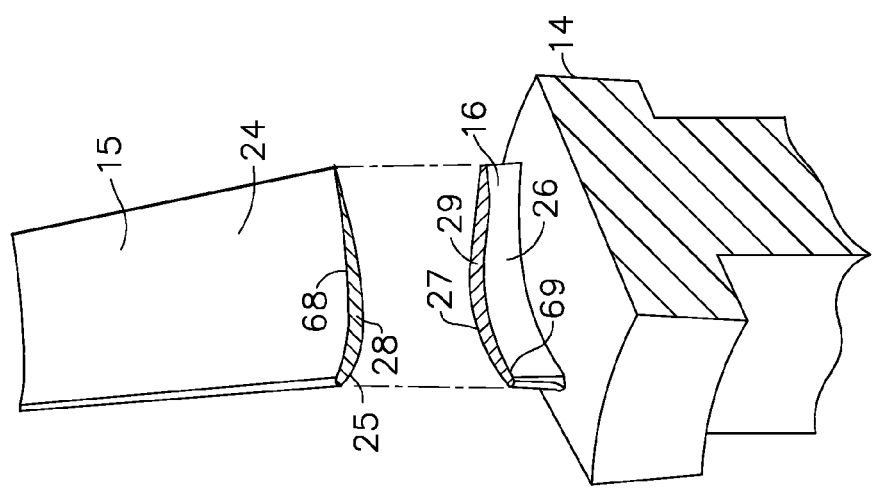

SOLID STATE RESISTANCE WELDING FOR AIRFOIL REPAIR AND MANUFACTURE

CROSS-REFERENCE TO RELATED APPLICATIONS

This application is a Continuation-In-Part of application Ser. No. 10/713,493, filed Nov. 14, 2003.

BACKGROUND OF THE INVENTION

1. Field of the Invention

This application relates generally to gas turbine engine blades and, more particularly, to methods for welding airfoil sections of gas turbine engine rotor blades.

2. Description of Related Art

At least some known gas turbine engines include a compressor for compressing air which is mixed with a fuel and channeled to a combustor wherein the mixture is ignited within a combustion chamber for generating hot combustion gases. The hot combustion gases are channeled downstream to a turbine, which extracts energy from the combustion gases for powering the compressor, as well as producing useful work to propel an aircraft in flight or to power a load, such as an electrical generator.

Known compressors include a rotor assembly that includes at least one row of circumferentially spaced rotor blades. Each rotor blade includes an airfoil that includes a pressure side, and a suction side extending between leading and trailing edges. Each airfoil extends radially outward from a rotor blade platform, disk, or drum. Some rotor blades also include a dovetail that extends radially inward from a shank coupled to a platform. The dovetail is used to mount the rotor blade to a rotor disk or drum. In at least some known compressors, the rotor blade is formed integrally with the rotor disk or drum and the assembly is often referred to as a BLISK or BLUM. Fan, compressor and other gas turbine engine rotors may have a BLISK or a BLUM. BLISKS have blades that are integral with a disk and BLUMS have blades that are integral with a drum. Conventionally, BLISKS and BLUMS are made by machining an airfoil shape (using conventional machining or ECM/EDM processes) from a forged disk. Linear and angularly reciprocating friction welding methods have been developed for manufacturing BLISKS and BLUMS for gas turbine engine rotors. Angularly reciprocating friction welding includes the disc or drum rotor being angularly reciprocated while the airfoils or blades are pressed radially against the disk or rotor circumference. Linear reciprocating friction welding includes linear reciprocating airfoils or the blades as they are pressed radially against the disk or rotor circumference.

During engine operation, leading and trailing edges of the blade and/or a tip of the compressor blade airfoil may deteriorate or become damaged due to any of a number of distress modes, including, but not limited to, foreign object damage (FOD), tip rubbing, oxidation, thermal fatigue cracking, or erosion caused by abrasives and corrosives in the flowing gas stream. To facilitate mitigating such operational effects, the blades are periodically inspected for damage, and a determination of an amount of damage and/or deterioration is made. If the blades have lost a substantial quantity of material, they are replaced. If the blades have only lost a small quantity material, they may be returned to service without repair. Alternatively, if the blades have lost an intermediate quantity of material, the blade airfoils may be repaired.

For example, at least one known method of repairing a turbine compressor blade airfoil includes mechanically removing, such as by grinding, a worn and/or damaged tip area and then adding a material deposit to the tip to form the tip to a desired dimension. The material deposit may be formed by several processes including welding and/or thermal spraying. Furthermore, special tooling is also used to achieve the precise dimensional relations between the original portion of the compressor blade and the added portion of the compressor blade airfoil. Thus, replacing a portion of a compressor blade airfoil may be a time-consuming and expensive process. Additionally, more complex airfoil shapes, for example three-dimensional aerodynamic configurations may increase the difficulty of welding and blending the repaired airfoil, thus resulting in increased repair costs. Thus, it is highly desirable to reduce the time and expense of replacing or attaching airfoil sections on both blades and BLISKS or BLUMS.

SUMMARY OF THE INVENTION

A method for bonding gas turbine engine airfoil sections to form an airfoil includes aligning an upper airfoil section having upper airfoil pressure and suction sides with a stub airfoil section having stub airfoil pressure and suction sides, the aligning including aligning upper and stub airfoil cross sections at upper and stub airfoil distal ends of the upper and stub airfoil sections respectively, pressing together the upper and stub airfoil cross sections, and then resistance welding the upper and stub airfoil sections together along the upper and stub airfoil cross sections by passing electrical current across the upper and stub airfoil cross sections while the upper and stub airfoil cross sections are being pressed together. The resistance welding is preferably solid state resistance welding.

A more particular embodiment of the method includes placing the stub airfoil section between pressure and suction side stub electrodes before the aligning, placing the upper airfoil section between pressure and suction side upper airfoil electrodes before the aligning, and applying electrical current to the electrodes during the solid state resistance welding. Copper braiding may be wrapped around the stub airfoil distal end before placing the stub airfoil section between pressure and suction side stub electrodes and wrapping copper braiding around the upper airfoil distal ends before placing the upper airfoil section between pressure and suction side upper airfoil electrodes.

In another more particular embodiment of the method, a stub airfoil portion of the stub airfoil section is left protruding out from the pressure and suction side stub electrodes when placing the stub airfoil section between pressure and suction side stub electrodes before the aligning and an upper airfoil portion of the upper airfoil section is left protruding out from the pressure and suction side upper airfoil electrodes when placing the stub airfoil section between pressure and suction side upper airfoil electrodes before the aligning. The wrappings may include wrapping copper braiding around the stub airfoil distal end at least up to and not including the stub airfoil portion and wrapping copper braiding around the upper airfoil distal ends at least up to and not including the upper airfoil portion before placing the upper airfoil section between pressure and suction side upper airfoil electrodes.

In yet another more particular embodiment of the method, a first set of copper pressure and suction side airfoil compliant electrode inserts are inset in the pressure and suction side stub electrodes respectively and a second set of copper pressure and suction side airfoil compliant electrode inserts are inset in the pressure and suction side upper airfoil electrodes respectively. The first and second sets of the pressure and suction side airfoil compliant electrode inserts conform to the airfoil shapes of the upper and stub airfoil distal ends respectively. The first and second sets of the pressure and suction side airfoil compliant electrode inserts extend at least up to and not including the upper airfoil portion and extend at least up to and not including the stub airfoil portion respectively.

The method may include simultaneously or separately coining the stub and upper airfoil portions to decrease or eliminate offsets between leading and trailing edges of the upper and stub airfoil cross sections for an airfoil having twist after placing the stub airfoil section between pressure and suction side stub electrodes and before the solid state resistance welding. The coining may include pressing the stub and upper airfoil portions between pressure and suction side coining dies.

The method for bonding gas turbine engine airfoil sections to form an airfoil may be performed while the stub airfoil section is attached to and extends outwardly from an airfoil carrier. The airfoil carrier may be an annular rim of a gas turbine engine rotor disk or a gas turbine engine drum or a gas turbine engine blade platform.

The method may be used for repairing a damaged airfoil by forming a stub airfoil section from a damaged airfoil by cutting away a damaged airfoil section from the damaged airfoil and aligning an upper airfoil section having upper airfoil pressure and suction sides with the stub airfoil section having stub airfoil pressure and suction sides wherein the stub airfoil section extends outwardly from an airfoil carrier. The aligning includes aligning upper and stub airfoil cross sections at upper and stub airfoil distal ends of the upper and stub airfoil sections respectively. A next step includes pressing together the upper and stub airfoil cross sections and then solid state resistance welding the upper and stub airfoil sections together along the upper and stub airfoil cross sections while the upper and stub airfoil cross sections are being pressed together. The damaged airfoil section may be cut away from the damaged airfoil along a cut line extending between leading and trailing edges of the damaged airfoil.

A more particular embodiment of the method for bonding gas turbine engine airfoil sections to form an airfoil includes placing a stub airfoil section between pressure and suction side stub electrodes and placing an upper airfoil section between pressure and suction side upper airfoil electrodes and aligning the upper airfoil section having upper airfoil pressure and suction sides with the stub airfoil section having stub airfoil pressure and suction sides. The aligning includes aligning upper and stub airfoil cross sections at upper and stub airfoil distal ends of the upper and stub airfoil sections respectively. The method further includes pressing together the upper and stub airfoil cross sections, clamping the upper airfoil section between the pressure and suction side upper airfoil electrodes, clamping the stub airfoil section between the stub airfoil pressure and suction sides, and then solid state resistance welding the upper and stub airfoil sections together along the upper and stub airfoil cross sections by passing electrical current across the upper and stub airfoil cross sections by applying electrical current to the electrodes while the upper and stub airfoil cross sections are being pressed together and while the upper airfoil section is clamped between the pressure and suction side upper airfoil electrodes and the stub airfoil section is clamped between the stub airfoil pressure and suction sides.

BRIEF DESCRIPTION OF THE DRAWINGS

The foregoing aspects and other features of the invention are explained in the following description, taken in connection with the accompanying drawings where:

FIG. 7 is perspective view diagrammatical illustration of replacing the damaged airfoil section illustrated in FIG. 6 by placing a replacement airfoil section on a stub airfoil section for solid resistance welding to repair one of the damaged airfoils in FIG. 1.

FIG. 8 is perspective view diagrammatical illustration of an airfoil with an upper airfoil section resistance welded to a stub airfoil section.

DETAILED DESCRIPTION OF THE INVENTION

Figures 1, 2:
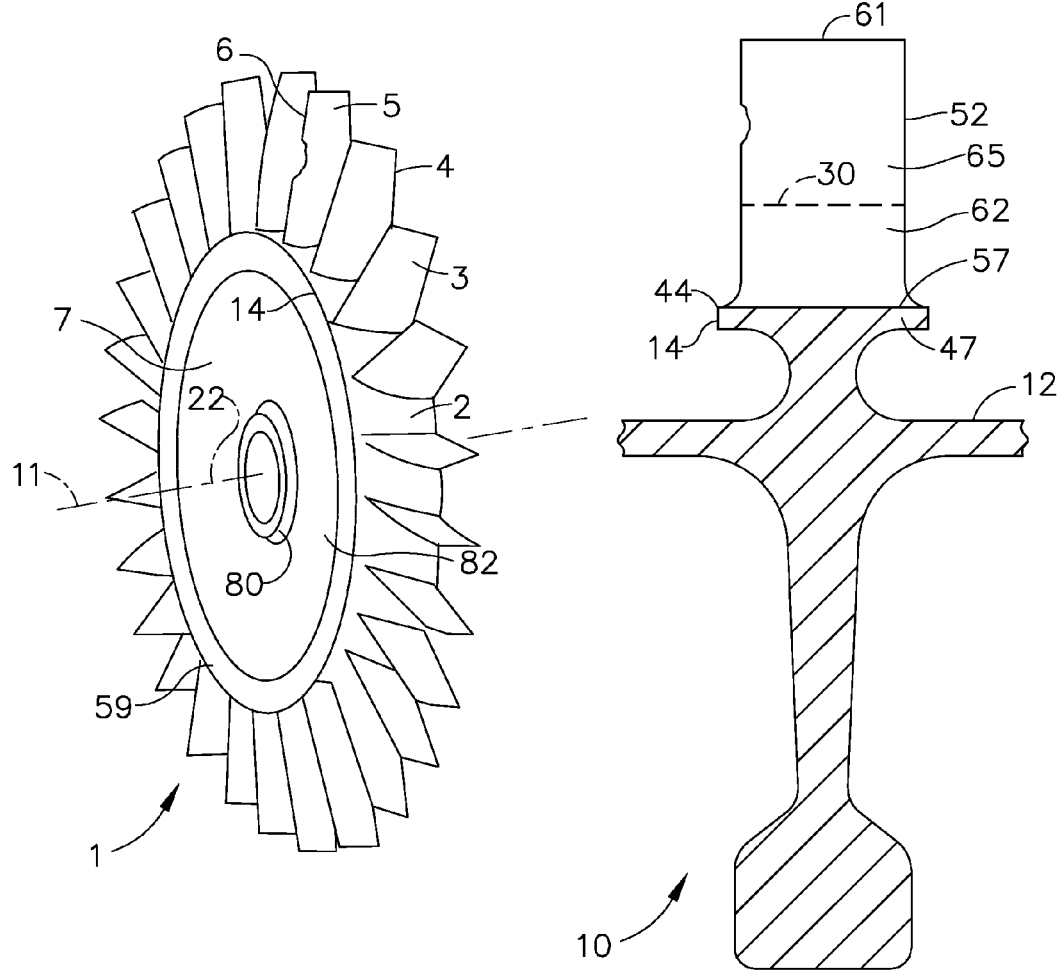
FIG. 1 is a perspective view illustration of a gas turbine engine compressor BLISK having damaged airfoils.
FIG. 2 is a longitudinal sectional view illustration of a gas turbine engine compressor BLUM having a damaged airfoil.

Illustrated in FIG. 1 is an exemplary turbofan gas turbine engine BLISK 1 circumscribed about an engine centerline 11 and having a plurality of airfoils 3 extending radially outwardly from a peripheral surface 2 of an annular rim 59 of a disk 7 of the BLISK 1. The airfoils 3 integral with the disk 7 and are illustrated as including undamaged airfoils 4 and a damaged airfoil 5 which is damaged in the area of its leading edge 6. The BLISK 1 includes a hub 80, a web 82 extending radially outwardly from the hub to the annular rim 59 and is circumscribed around an axis 22 which coincides with the engine centerline 11.

Illustrated in FIG. 2 is an exemplary portion of a turbofan gas turbine engine BLUM 10 which may be from a fan or compressor of the engine. BLISKS have blades or airfoils that are integral with a disk and BLUMS have blades or airfoils that are integral with a drum 12. A plurality of airfoils 52 extend radially outwardly from, are circumferentially disposed about, and integral with the drum 12. The airfoils 52 extend radially outwardly from respective airfoil bases 57 on a radially outer flowpath surface 44 of the drum 12 or platforms 47 to airfoil tips 61.

The airfoils 52 are illustrated herein as including radially or longitudinally inner and outer airfoil sections 62, 65 bonded together using preferably solid state resistance welding along a solid state resistance weld 30 radially or longitudinally located between the base 57 and the tip 61. Solid state resistance welding is a resistance welding method that conducts electrical current from electrodes attached to the parts that are being welded together in a manner that doesn't melt the welding surfaces but rather softens or plasticizes the surrounding area and uses a pressure or force on the parts to weld them together, much like forging. No melted material remains in the weld joint. This is desirable because remnant melted or partially melted material in the weld joint reduces mechanical performance. At the start of the welding, the inner and outer airfoil sections 62, 65 are pressed together under a longitudinal static load. As the welding current causes resistance heating at a weld interface of the airfoil sections, the material becomes hot and becomes plasticized. At this point, the material begins to collapse under the force and about half way through the total upset (collapse) distance, additional load or force (forge force, 3× that of the initial weld force) may be applied. The purpose of this additional force is to ensure the initial weld interface material is displaced out of the joint in the form of weld flash to insure internal quality (no entrapped oxides) and that no melted or partially melted material remains in the weld joint. This weld flash is subsequently removed after welding such as by either manual benching with a grinder, or by adaptive milling on an NC machine.

The solid state resistance welding technique disclosed herein can used AC or DC power sources to heat the material at the weld interface to a plasticizing range under compressive force (weld force) but not to a melting range. After a period or duration of time (heating time), the compressive force is increased (forge force) allowing the plasticized material local to the weld interface to extrude leaving a flash (or flash curl) that is later trimmed off. The resistance weld 30 may be formed during original manufacture of the BLUM or during repair of the airfoil 52. The airfoils 52 and the rim 59 or drum 12 may be made from the same material with similar grain structures, or two different alloys or dissimilar materials with dissimilar grain structure, e.g. molybdenum to tungsten, or the same material with dissimilar grain structures, i.e. cast to forged parts.

One embodiment of the solid state resistance welding method disclosed herein can be used for both new-make and repair. The solid state resistance welding method uses electrical resistive heating (resistance to electrical current) to locally soften (plasticize) the material prior to mechanically forging the weld by applying compressive forces to the two parts being welded together. DC power sources may be are used for both processes. We have found that the new-make process should use either mid frequency, primary rectified, or secondary rectified DC current while the repair process should use a mid-frequency DC supply. In each case, the weld develops and finalizes in the solid state. Welding electrical current and compressive force are varied during the process to achieve a solid state weld with out melting the interface area.

Figure 3:
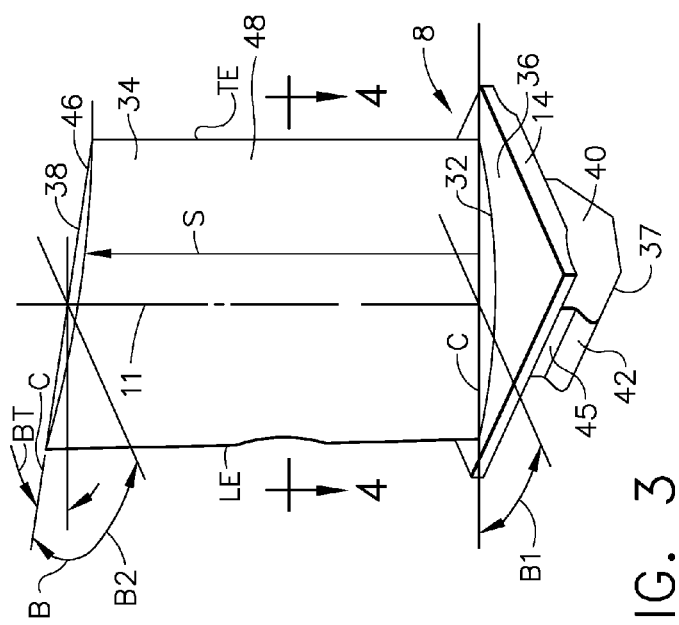
FIG. 3 is a perspective view illustration of a gas turbine engine compressor blade having a damaged airfoil.
Figure 4:
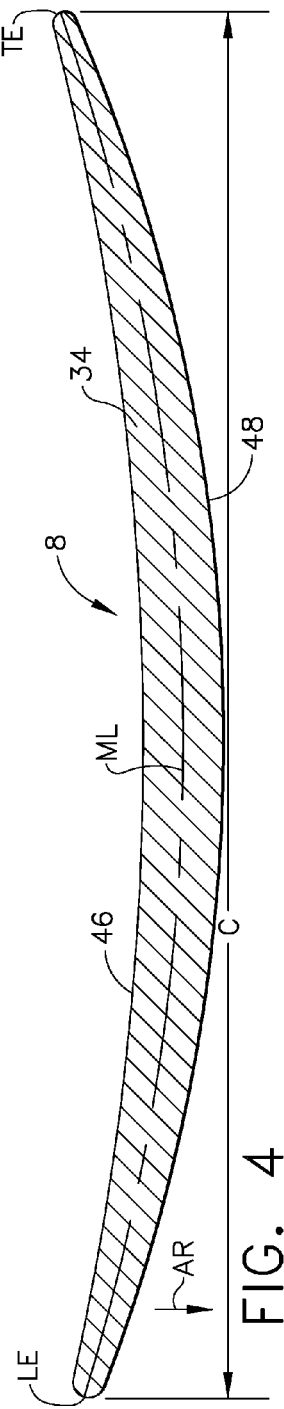
FIG. 4 is a cross-sectional view illustration of the airfoil through 4-4 in FIG. 3.

Illustrated in FIGS. 3 and 4 is a solid compressor blade 8 (exemplifying a fan or compressor blade) with an airfoil 34 extending radially outwardly from an airfoil base 32 located on a blade platform 36 to an airfoil radially outer tip 38 as measured along a span S of the airfoil 34. The compressor blade 8 includes a root section 40 extending radially inward from the blade platform 36 to a radially inner end 37 of the root section 40. A blade root or dovetail 42 is connected by a blade shank 45 to the blade platform 36 at the radially inner end 37 of the root section 40. The compressor blade 8 is representative of class of gas turbine engine components having airfoils and, more particularly, to blades such as fan, compressor, and turbine blades for which the solid state resistance welding method disclosed herein was developed. The method disclosed herein may also be applied to stationary vanes in fan, compressor, and turbine sections of a gas turbine engine.

Referring to FIG. 4, a chord C of the airfoil 34 is the line between a leading edge LE and a trailing edge TE at each cross section of the airfoil 34. The airfoil 34 extends in the chordwise direction between a leading edge LE and a trailing edge TE of the airfoil. The airfoil 34 includes pressure and suction sides 46, 48 of the airfoil 34 with the suction side 48 facing in a general direction of rotation as indicated by arrow AR. A mean-line ML is generally disposed midway between the pressure and suction sides 46, 48 in the chordwise direction. Referring to FIG. 3, often the airfoil 34 has a twist whereby a chord angle B varies from the blade platform 36 to the airfoil outer tip 38. The chord angle B is defined as the angle of the chord C with respect to the engine centerline 11. The chord angle varies from a first angle B1 at the platform 36 to a second angle B2 at the tip 38 for which the difference is shown by an angle differential BT. The chord angle is defined as the angle of the chord C with respect to the engine centerline 11.

Figure 5:
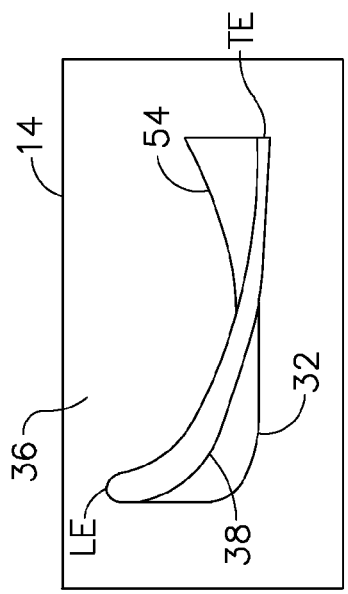
FIG. 5 is perspective view diagrammatical illustration of a twisted airfoil.

Illustrated perspectively in FIG. 5 is a twisted airfoil 54 extending radially outwardly from an airfoil base 32 located at a blade platform 36 to an airfoil radially outer tip 38. The twisted airfoil 54 extends in a chordwise direction between a leading edge LE and a trailing edge TE of the twisted airfoil 54. The blade platform 36, the annular rim 59 of the BLISK 1, and the drum 12 of the BLUM 10 represent airfoil carriers 14 that support the airfoils described above.

Generally diagrammatically illustrated in FIGS. 7 and 8 is a method of solid state resistance welding an upper airfoil section 15 to a stub airfoil section 16 extending outwardly from an airfoil carriers 14. The solid state resistance welding method disclosed herein is particularly useful for net shape upper airfoil sections 15. The upper airfoil section 15 has upper airfoil pressure and suction sides 24, 25 and the stub airfoil section 16 has stub airfoil pressure and suction sides 26, 27. The upper and stub airfoil sections 15, 16 include mating upper and stub airfoil cross sections 28, 29 at upper and stub airfoil distal ends 68, 69 respectively along which the resistance weld 30 is formed. The mated upper and stub airfoil cross sections 28, 29 form the weld interface.

Figure 6:
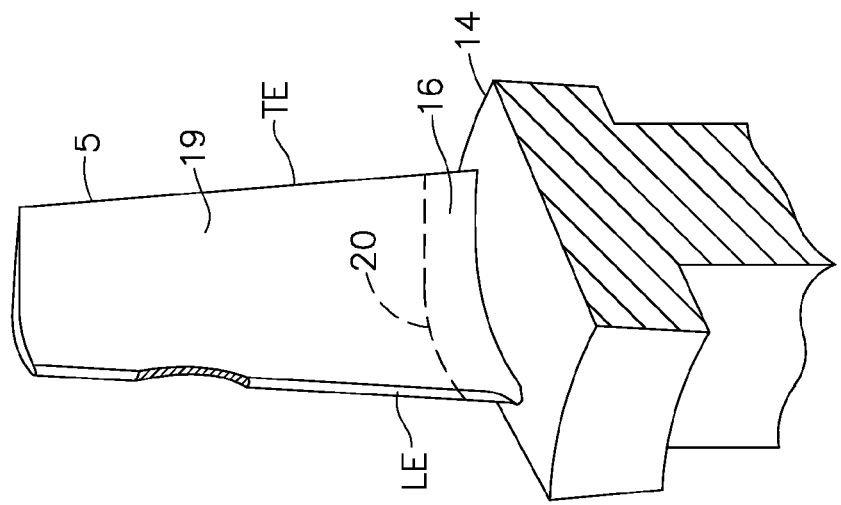
FIG. 6 is perspective view diagrammatical illustration of cutting off a damaged airfoil section one of the damaged airfoil illustrated in FIG. 1.
Figure 9:
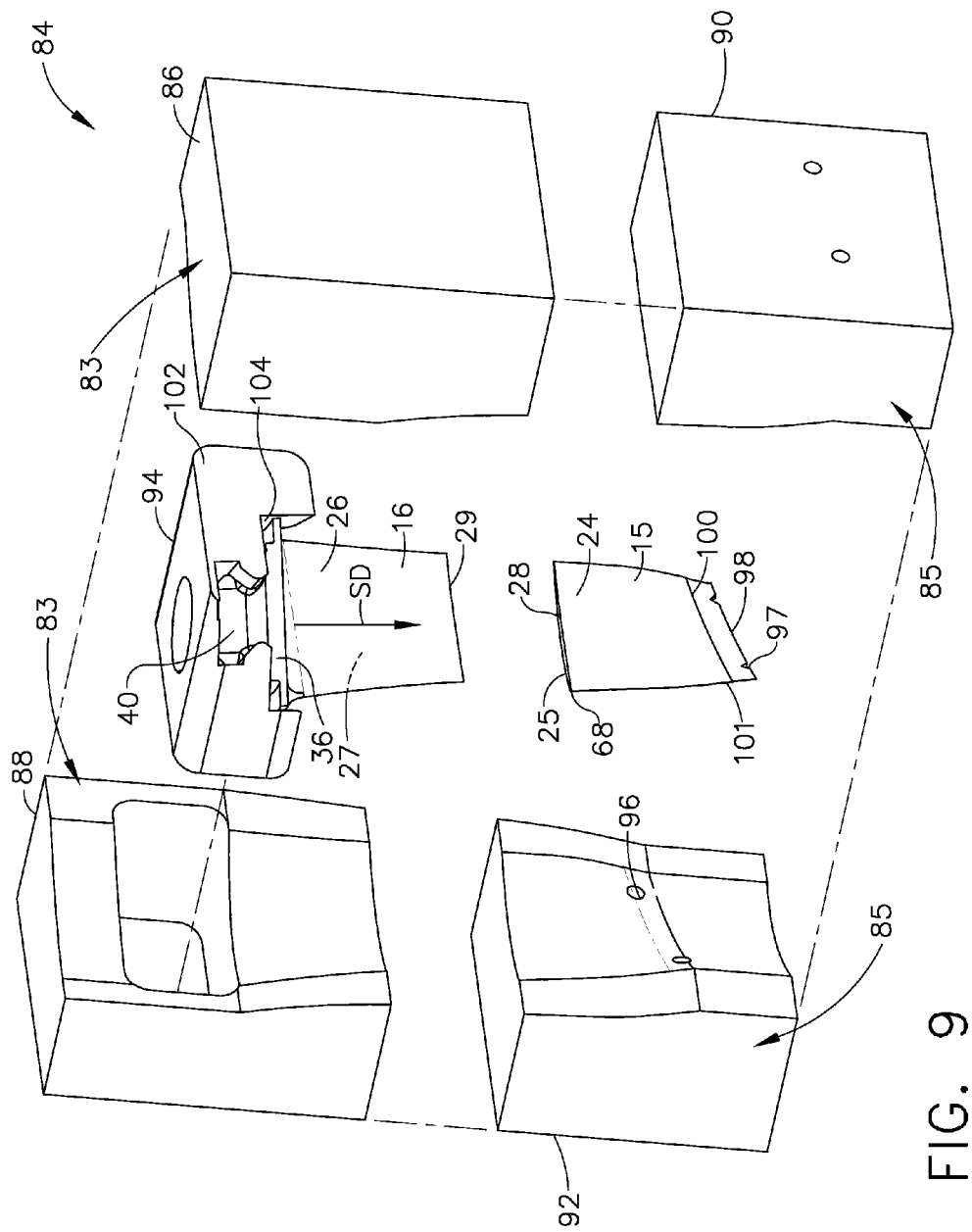
FIG. 9 is a perspective exploded view diagrammatical illustration of replacement airfoil and stub airfoil sections in an exemplary resistance welding electrode assembly used to perform the solid state resistance welding.
Figure 10:
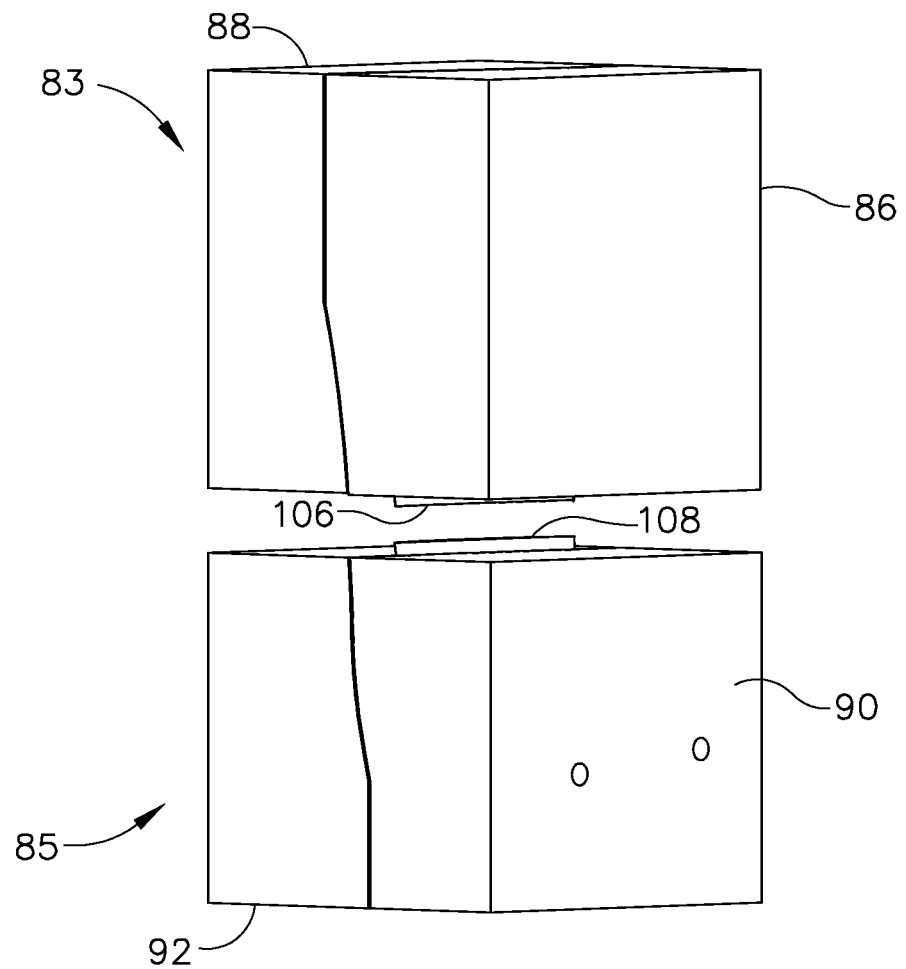
FIG. 10 is a perspective view diagrammatical illustration of stub and upper airfoil portions of the stub and upper airfoil sections respectively protruding out from pressure and suction side stub electrodes and the pressure and suction side upper airfoil electrodes respectively in the exemplary solid state resistance welding electrode assembly illustrated in FIG. 9.

The solid state resistance welding may be used to repair a damaged airfoil 5 as illustrated in FIG. 6. The upper airfoil section 15 may be a replacement airfoil section 18 used to replace a damaged airfoil section 19 which has been cut away from a damaged airfoil 5 as illustrated in FIG. 6. Cutting away of the damaged airfoil section 19 is illustrated along a cut line 20 separating the damaged airfoil section 19 from the remaining stub airfoil section 16 and extending between a leading edge LE and a trailing edge TE of the damaged airfoil 5. FIGS. 9 and 10 diagrammatically illustrate one embodiment of a solid state resistance welding electrode assembly 84 including stub and upper electrodes 83, 85 used to hold and supply electrical current to the stub and upper airfoil sections 16, 15 during the solid state resistance welding process and thus pass electrical current across the upper and stub airfoil cross sections 28, 29. The stub and upper airfoil distal ends 69, 68 protrude at least partially outwardly from the stub and upper electrodes 83, 85 spacing the stub and upper airfoil cross sections 29, 28 apart from the stub and upper electrodes 83, 85 respectively.

The exemplary embodiment of the solid state resistance welding electrode assembly 84 illustrated diagrammatically in FIG. 9 and elsewhere herein includes pressure and suction side stub electrodes 86, 88 designed to conform to the stub airfoil pressure and suction sides 26, 27 respectively of the stub airfoil section 16. The solid state resistance welding electrode assembly 84 also includes pressure and suction side upper airfoil electrodes 90, 92 designed to conform to the upper airfoil pressure and suction sides 24, 25 of the upper airfoil section 15. The use of these four electrodes allows pressure to be applied through the electrodes in the spanwise direction SD to press together the mating upper and stub airfoil cross sections 28, 29 (illustrated in more detail in FIG. 7) along which the resistance weld 30 is formed during the welding process while passing electrical current across the upper and stub airfoil cross sections 28, 29.

A clamping force is applied to the pressure and suction side upper airfoil electrodes 90, 92 clamping the upper airfoil section 15 between the pressure and suction side upper airfoil electrodes 90, 92 during the welding process. A clamping force is applied to the pressure and suction side stub electrodes 86, 88 clamping the stub airfoil section 16 between the pressure and suction side stub electrodes 86, 88 during the welding process.

Stub and upper airfoil positioning features 94 and 96 may be used to position the stub airfoil section 16 and the upper airfoil section 15 respectively in between four electrodes. An optional extension 98 may be formed on an airfoil section tip 100 of the upper airfoil section 15 to help position the upper airfoil section 15. The airfoil section tip 100 is at a second distal end 101 spaced spanwise apart from the upper airfoil distal end 68 of the upper airfoil section 15. The extension 98, if used, is machined away after the welding process is complete. Notches 97 in the airfoil section tip 100 engage the upper airfoil positioning feature 96, illustrated as posts, to position the upper airfoil section 15. As illustrated in FIG. 9, the stub airfoil positioning feature 94 includes a block 102 having a slot 104 conforming to the shape and size of the root section 40 and the blade platform 36 from which the stub airfoil section 16 extends outwardly.

Illustrated in FIG. 10 are very small stub and upper airfoil portions 106, 108 of the stub and upper airfoil sections 16, 15 respectively (illustrated in FIG. 9) protruding out from the pressure and suction side stub electrodes 86, 88 and the pressure and suction side upper airfoil electrodes 90, 92 respectively. These protruding stub and upper airfoil portions 106, 108 are partially consumed in the solid state resistance welding process and the remainder forms flash around the resistance weld 30 and the flash is machined away after the welding process. One exemplary method provides stub and upper airfoil portions 106, 108 protruding out from the pressure and suction side stub electrodes 86, 88 and the pressure and suction side upper airfoil electrodes 90, 92 respectively about 0.020 to 0.200 inches each depending upon the chord length and midspan thickness of the airfoil. This provides a total gap of 0.040-0.400 inches between the pressure and suction side stub electrodes 86, 88 and the pressure and suction side upper airfoil electrodes 90, 92.

Figure 11:
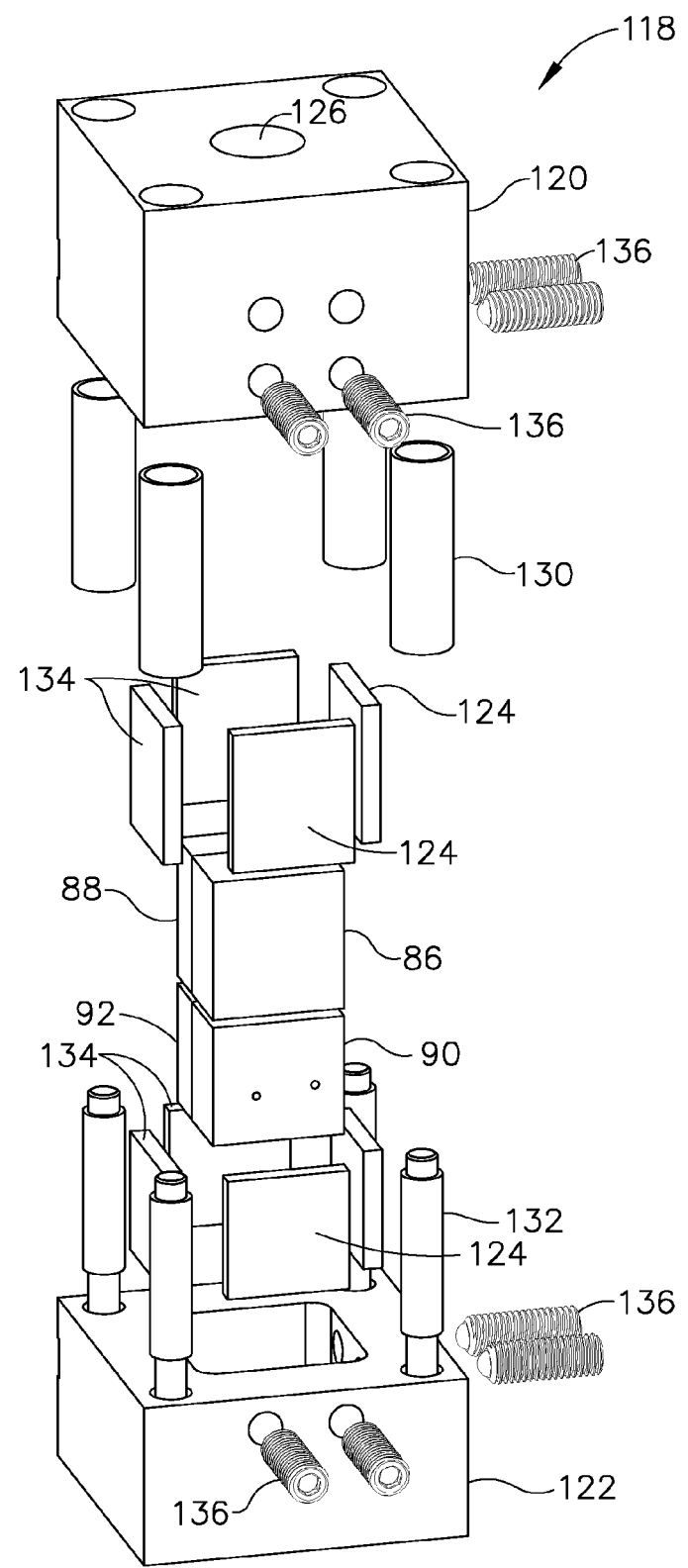
FIG. 11 is a perspective exploded view diagrammatical illustration of an exemplary welding fixture which holds the stub and upper airfoil sections of the exemplary solid state resistance welding electrode assembly illustrated in FIG. 10.

Diagrammatically illustrated in FIG. 11 is an exemplary welding fixture 118 which holds the stub and upper airfoil sections 16, 15 with the stub and upper airfoil portions 106, 108 (illustrated in FIGS. 9 and 10) protruding out from the pressure and suction side stub electrodes 86, 88 and the pressure and suction side upper airfoil electrodes 90, 92 respectively for the welding process. An upper electrode holder block 120 holds the pressure and suction side upper airfoil electrodes 90, 92 with the upper airfoil section 15 supported therein. The upper electrode holder block 120 is made from copper or a copper alloy. A lower electrode holder block 122, which is made from copper or a copper alloy, holds the pressure and suction side stub electrodes 86, 88 with the stub airfoil section 16 supported therein. Alternatively, the lower electrode holder block 122 may be made from an aluminum material that has a low mass because this block moves during the welding process. The low mass enables faster follow-up during welding, which may be required for some applications.

Non-magnetic Inconel pressure pads 124 are used to transmit force from clamping bolts 136 to the pressure and suction side stub electrodes 86, 88 and the pressure and suction side upper airfoil electrodes 90, 92. The clamping bolts 136 screw into the blocks and contact the pads to put a more evenly spread clamping pressure on the pressure and suction side stub electrodes 86, 88 and the pressure and suction side upper airfoil electrodes 90, 92. This prevents denting of the electrodes, which are made of copper or a copper alloy. A copper shunt pad 126 is used to transfer current from a welding machine copper platen (not shown) to the electrodes located inside the upper electrode holder block 120 which may be made of aluminum. This avoids passing current through aluminum, which is undesirable because contact resistance varies with an oxide layer that forms on the surface of the aluminum.

Press poles 132 are used to guide the upper electrode holder block 120 as it is lowered toward the lower electrode holder block 122 and holds the stub and upper airfoil sections 16, 15 properly aligned with respect to each other. The press poles 132 are electrically isolated from upper and lower electrode holder blocks by non-conductive low friction insulation sleeves 130 and/or isolated linear bearing (not shown in the drawings). The sleeves 130 are disposed and prevents contact between the press poles 132 and the lower electrode holder block 122.

Copper transfer pads 134 are used to transfer and equalize current into the electrodes as current passes from the welding machine copper platen (not shown) through the copper shunt pad 126 to the electrodes located inside the upper electrode holder block 120. The transfer pads 134 are used to transfer current into from the pressure and suction side upper airfoil electrodes 90, 92 within the upper electrode holder block 120 to the pressure and suction side stub electrodes 86, 88 within the lower electrode holder block 122 during the welding process. The welding process includes putting a force on the copper transfer pads 134 and then passing current into the electrodes and thus placing the upper and stub airfoil sections 15, 16 in compression against each other while pressing the upper and stub airfoil cross sections 28, 29 together respectively.

After the current has been running for a period of time, the force on the copper pads is increased or varied. At the start of the welding the loading of the weld interface is static. As the process proceeds, the interface softens due to heat. The welding illustrated herein includes some pulsing to achieve better heating uniformity, i.e. 6 individual pulses. Note that the upper and stub airfoils collapse slightly with each successive pulse due to elimination of asperity peaks, and/or out of flatness between the surfaces at the interface.

During the last pulse, the welding current and/or forge force is applied which increases the rate of collapse to insure sufficient upset to remove impurities and/or molten material from the weld joint.

The resistance weld 30 is formed along the pressed together upper and stub airfoil cross sections 28, 29. Statically means that upper and stub airfoil cross sections 28, 29 remain stationary with respect to each other during an initial portion of the solid state resistance welding process.

The pressure and force is applied by the welding machine copper platen (not shown) pressing down on the copper shunt pad 126 during the welding process.

Figure 12:
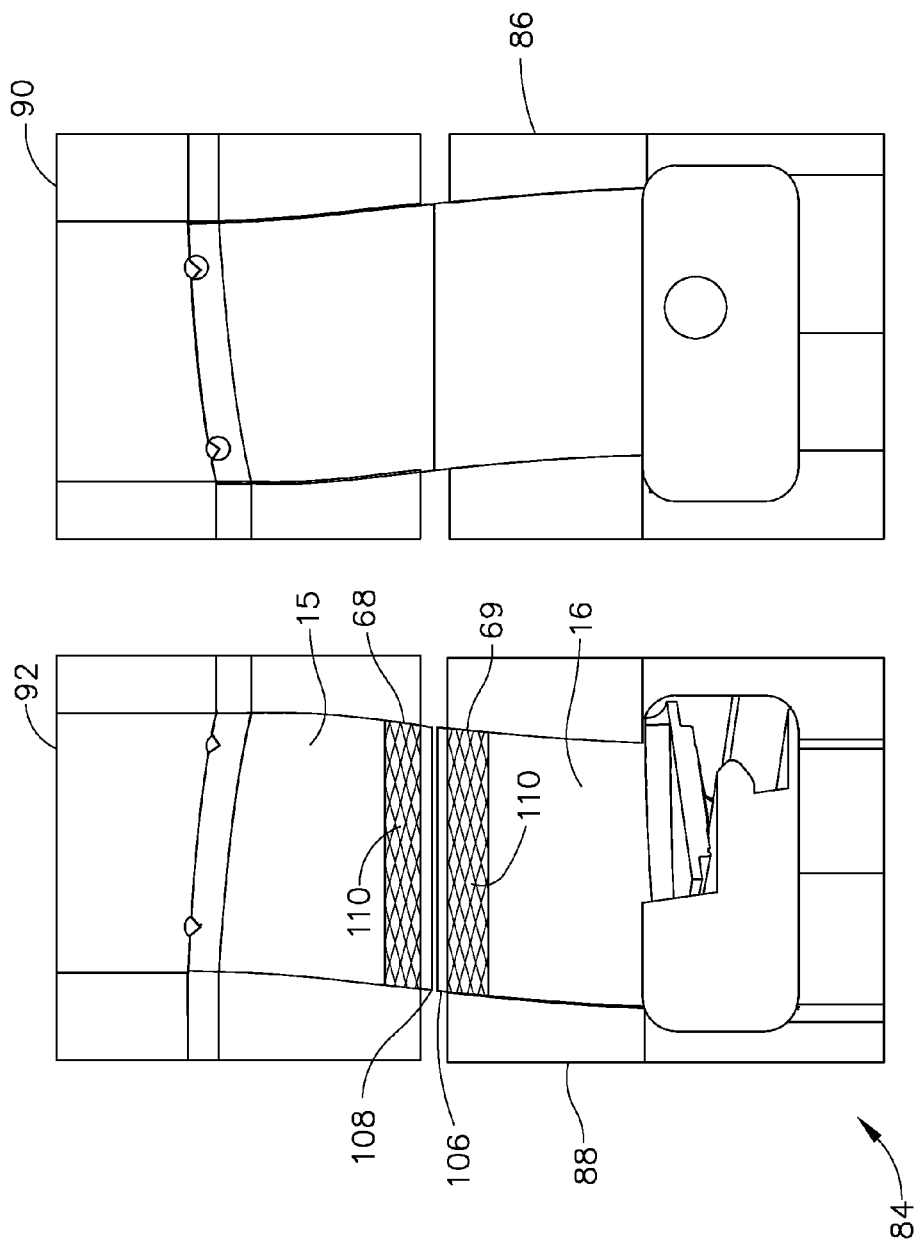
FIG. 12 is a perspective view diagrammatical illustration of copper braiding tightly wrapped around upper and stub airfoil distal ends near where the resistance weld is formed between the stub and upper airfoil sections of the exemplary solid state resistance welding electrode assembly illustrated in FIG. 10.

Illustrated in FIG. 12 is copper braiding 110 tightly wrapped around and conforms to airfoil shapes of the upper and stub airfoil distal ends 68, 69 of the upper and stub airfoil sections 15, 16 respectively near where the resistance weld 30 is formed. The copper braiding 110 may extend up to but not cover the stub and upper airfoil portions 106, 108 which will protrude out from the pressure and suction side stub electrodes 86, 88 and the pressure and suction side upper airfoil electrodes 90, 92 respectively. The copper braiding 110 is wrapped around, contacts, and conforms to the shape of the upper airfoil pressure and suction sides 24, 25 and the stub airfoil pressure and suction sides 26, 27 of the upper and stub airfoil sections 15, 16 respectively. These optional features of the solid state resistance welding process and the solid state resistance welding electrode assembly 84 disclosed herein improve respective conductivity between the pressure and suction side stub electrodes 86, 88 and the pressure and suction side upper airfoil electrodes 90, 92 and the upper and stub airfoil distal ends 68, 69 respectively where the resistance weld 30 is formed. The copper braiding 110 operates as a welding shunt and results in a better weld by localizing the electrode force and current transfer to an area very close to the weld interface. This prevents bulk heating of the part, which can result in buckling at the LE and TE.

Figure 13:
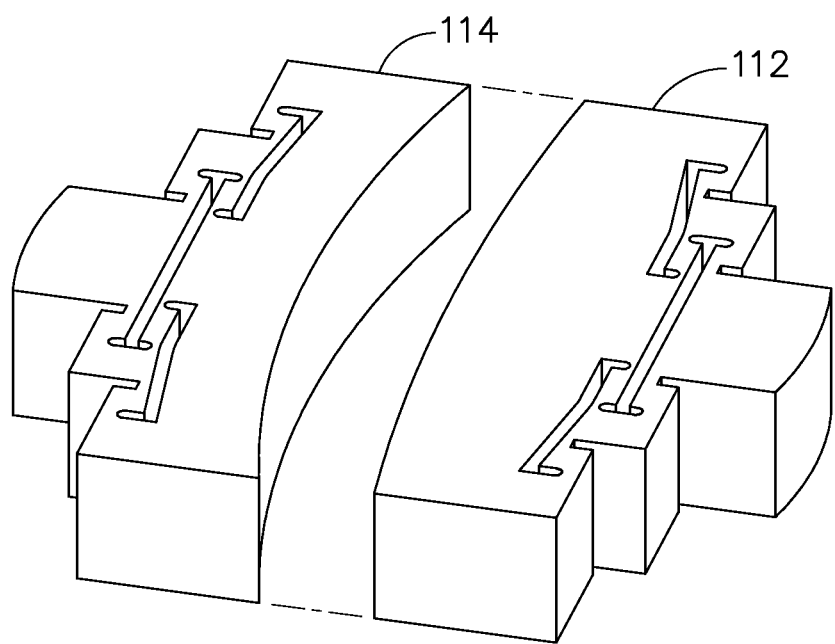
FIG. 13 is a perspective view diagrammatical illustration of copper pressure and suction side airfoil compliant electrode inserts for use in the pressure and suction side stub electrodes and the pressure and suction side upper airfoil electrodes of the exemplary solid state resistance welding electrode assembly illustrated in FIG. 10.

Diagrammatically illustrated in FIG. 13 are copper pressure and suction side airfoil compliant electrode inserts 112, 114 inset in both the pressure and suction side stub electrodes 86, 88 and the pressure and suction side upper airfoil electrodes 90, 92 illustrated in FIG. 11. The pressure and suction side airfoil compliant electrode inserts 112, 114 conform to the airfoil shapes of the upper and stub airfoil distal ends 68, 69 respectively near where the resistance weld 30 is formed in a manner similar to that of the copper braiding 110 described above. The airfoil compliant electrodes are designed to provide good contact under pressure and good conductivity the between the pressure and suction side stub electrodes 86, 88 and the pressure and suction side upper airfoil electrodes 90, 92 and the upper and stub airfoil distal ends 68, 69 respectively where the resistance weld 30 is formed.

A first set of the pressure and suction side airfoil compliant electrode inserts 112, 114 are disposed in the upper electrode holder block 120 and a second set of the pressure and suction side airfoil compliant electrode inserts 112, 114 are disposed in the lower electrode holder block 122 illustrated in FIG. 11.

In this alternative configuration the upper electrode holder block 120 contacts and conforms to the shape of the upper airfoil pressure and suction sides 24, 25 and lower electrode holder block 122 contacts and conforms to the shape of the stub airfoil pressure and suction sides 26, 27 of the upper and stub airfoil sections 15, 16.

Figure 14:
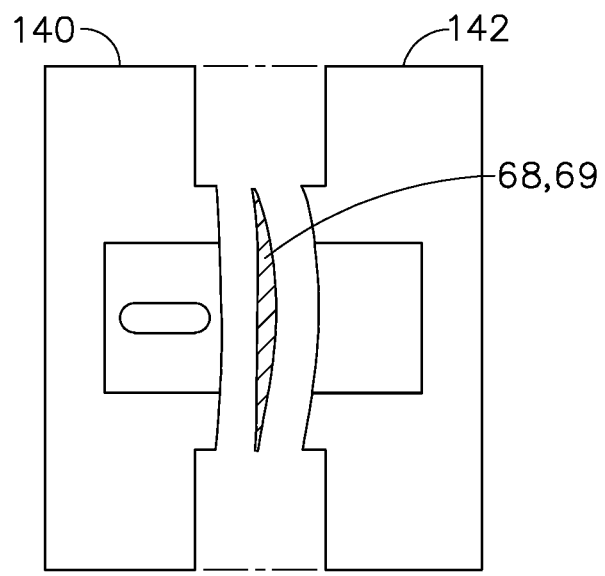
FIG. 14 is a perspective view diagrammatical illustration of the stub and upper airfoil portions illustrated in FIG. 10 pressed between pressure and suction side coining dies.
Figure 15:
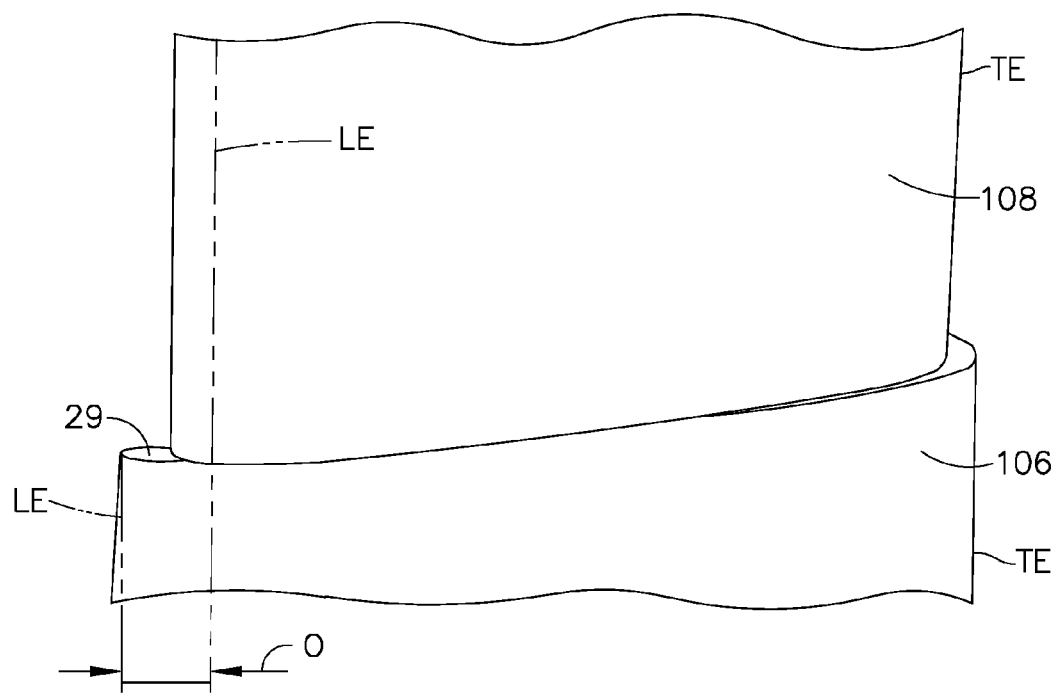
FIG. 15 is a perspective view diagrammatical illustration of an exemplary offset between leading and trailing edges of upper and stub airfoil cross sections of a twisted airfoil.
Figure 16:
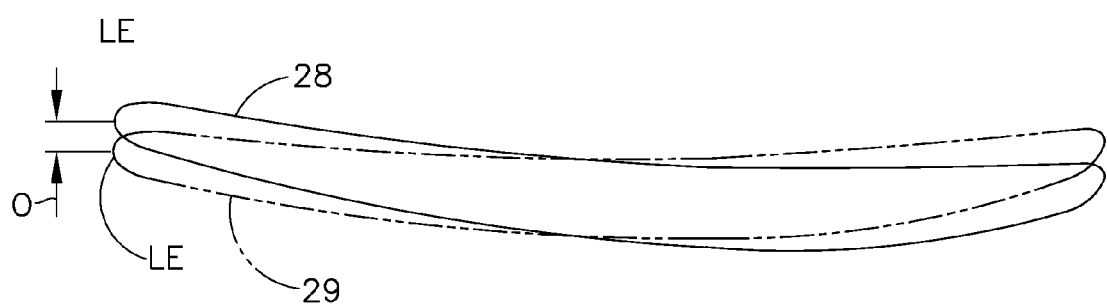
FIG. 16 is a sectional view diagrammatical illustration of the exemplary offset between leading and trailing edges of upper and stub airfoil cross sections of illustrated in FIG. 15.

Diagrammatically illustrated in FIG. 14 is an optional coining process performed before the solid state resistance welding process. The coining process is designed to provide a better alignment between the upper and stub airfoil cross sections 28, 29 of the upper and stub airfoil distal ends 68, 69 for the repair or new manufacture of a twisted airfoil 54 such as the one illustrated perspectively in FIG. 5. Because of the twist, there is a mismatch between the upper and stub airfoil cross sections 28, 29 as illustrated by an exemplary 0.007 offset O between the leading edges LE of the upper and stub airfoil cross sections 28, 29 and between the trailing edges TE of the upper and stub airfoil cross sections 28, 29 as illustrated in FIGS. 15 and 16. The coining process may be performed with the stub and upper airfoil portions 106, 108 of the stub and upper airfoil sections 16, 15 respectively protruding out from the pressure and suction side stub electrodes 86, 88 and the pressure and suction side upper airfoil electrodes 90, 92 while they mounted in the upper and lower electrode holder blocks 120, 122 respectively as illustrated in FIGS. 10 and 11. Referring to FIG. 14, the upper and stub airfoil distal ends 68, 69 are pressed between pressure and suction side coining dies 140, 142 to produce a common or near common twist for the stub and upper airfoil portions 106, 108 and to decrease or eliminate the offset between the leading edges LE of the upper and stub airfoil cross sections 28, 29 and between the trailing edges TE of the upper and stub airfoil cross sections 28, 29. The method may include simultaneously or separately coining the stub and upper airfoil portions 106, 108 before the solid state resistance welding.

Figure 17:
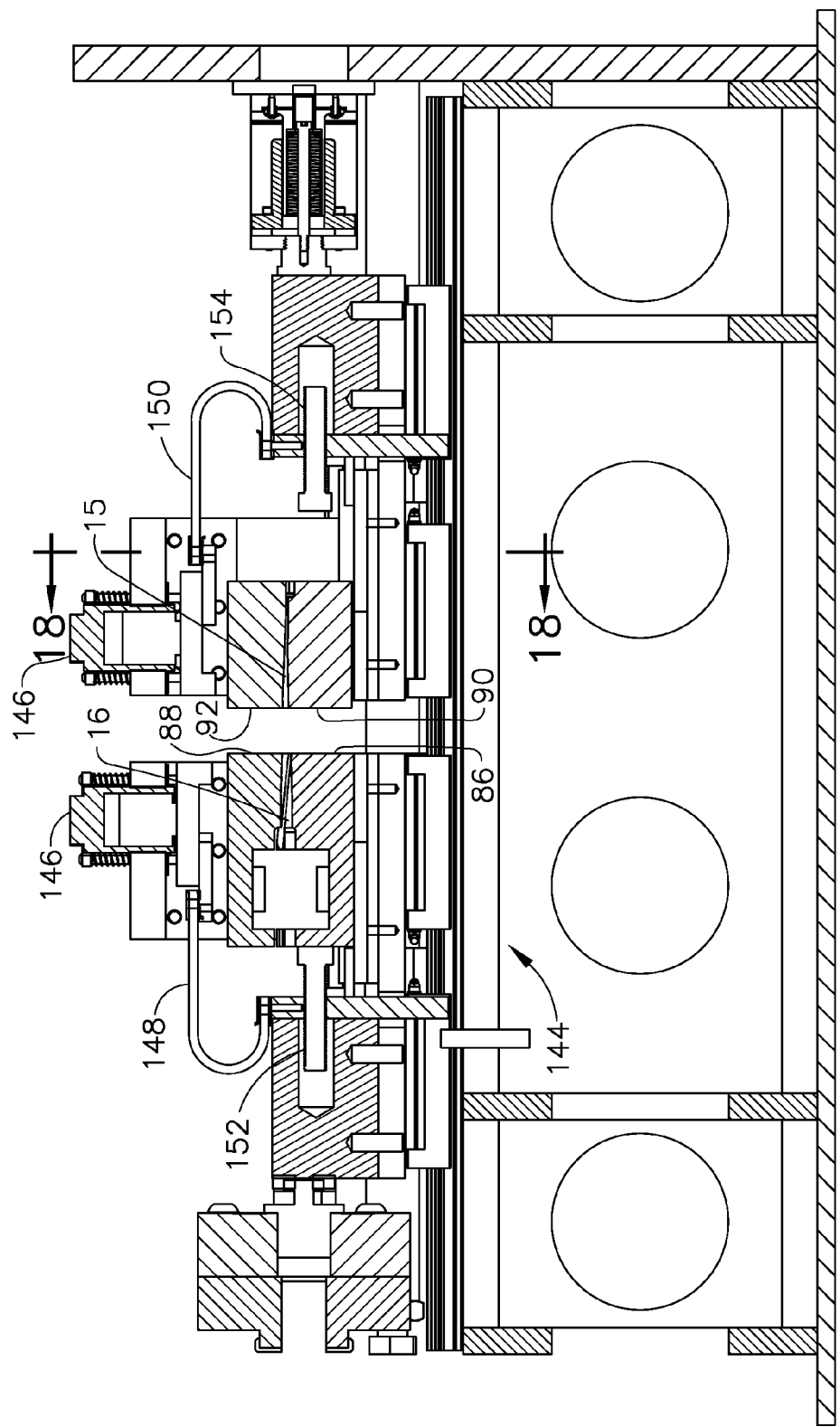
FIG. 17 is a sectional view diagrammatical illustration of an alternative exemplary welding fixtures having electrodes slidably mounted on a horizontal machine frame.
Figure 18:
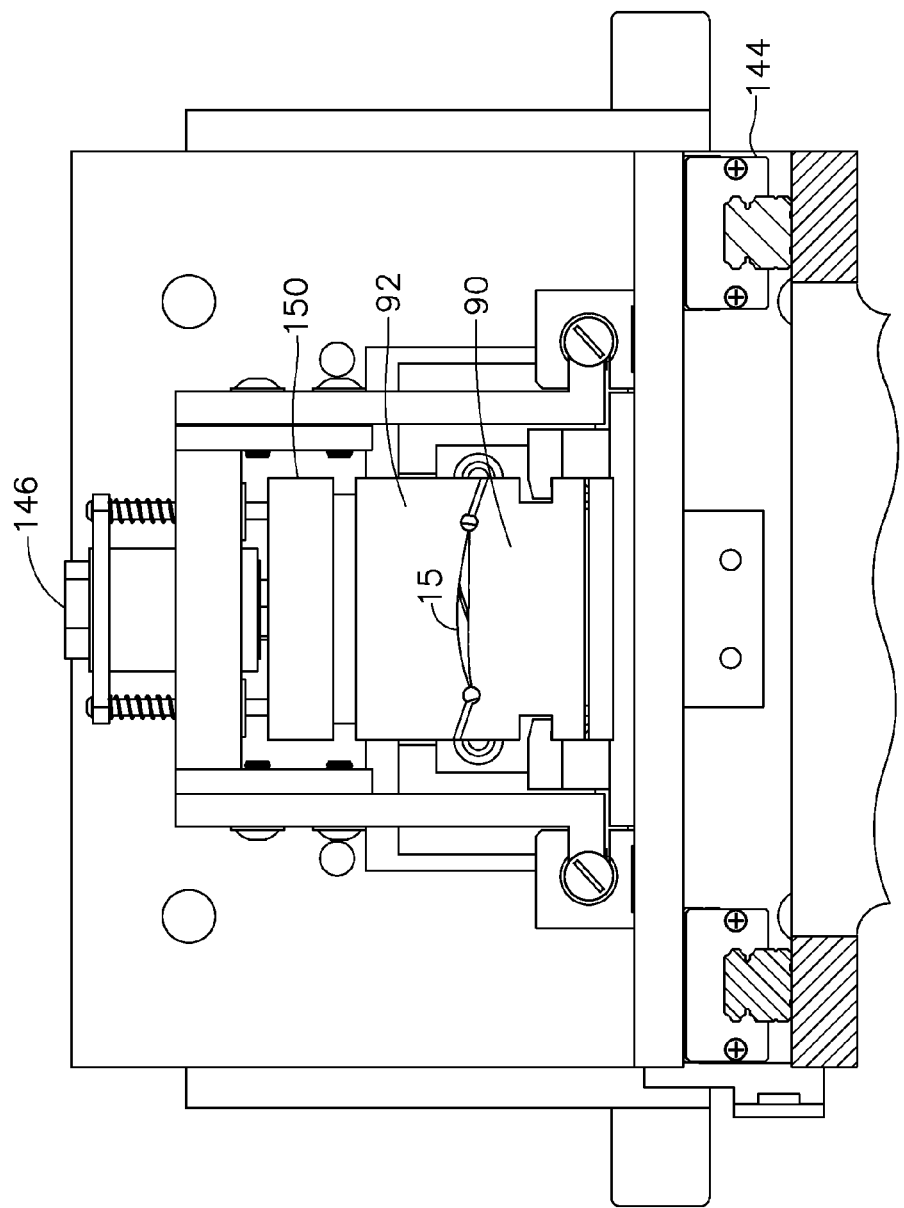
FIG. 18 is a sectional view diagrammatical illustration of the alternative exemplary welding fixture mounted through 18-18 of the horizontal machine frame illustrated in FIG. 17.

Diagrammatically illustrated in FIGS. 17 and 18 is an exemplary alternative to the welding fixture 118 illustrated in FIG. 11 for holding the stub and upper airfoil sections 16, 15 during the welding process. The stub airfoil section 16 is held between pressure and suction side stub electrodes 86, 88 and the upper airfoil section 15 is held between pressure and suction side upper airfoil electrodes 90, 92. The electrodes are slidably mounted on a horizontal machine frame 144. Hydraulic cylinders 146 are used to apply clamping loads on the pressure and suction side stub electrodes 86, 88 and the pressure and suction side upper airfoil electrodes 90, 92 during the solid state resistance welding process. The stub and upper airfoil portions 106, 108 protrude out from the pressure and suction side stub electrodes 86, 88 and the pressure and suction side upper airfoil electrodes 90, 92 respectively for the welding process. Electrical stub and upper airfoil shunts 148, 150 are pressed tightly against the suction side stub electrode 88 and the suction side upper airfoil electrode 92 respectively to supply current for the welding process. Stub and upper airfoil rams 152, 154 are used to apply pressure on the upper and stub airfoil sections 15, 16 along the upper and stub airfoil cross sections 28, 29 respectively along which the resistance weld 30 is formed.

Figure 19:
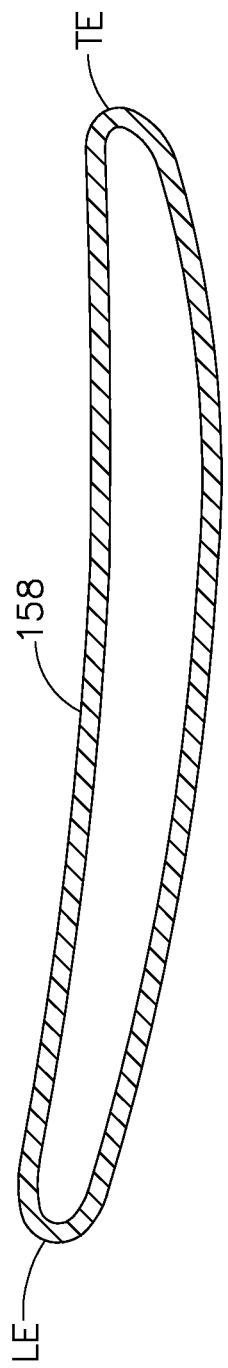
FIG. 19 is a sectional view diagrammatical illustration of a hollow airfoil for which the method may be used.

The solid state resistance welding method between radially inner and outer airfoil sections 62, 65 disclosed herein has been illustrated above for a solid airfoil 3. The method may also be used for a hollow airfoil 156 having an airfoil wall 158 including pressure and suction side wall portion extending chordwise between leading and trailing edges LE, TE as illustrated in FIG. 19.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A method for bonding gas turbine engine airfoil sections to form an airfoil, the method comprising:
    placing a stub airfoil section having stub airfoil pressure and suction sides between pressure and suction side stub electrodes respectively,
    placing an upper airfoil section having upper airfoil pressure and suction sides between pressure and suction side upper airfoil electrodes respectively,
    aligning the upper airfoil section with the stub airfoil section,
    the aligning including aligning upper and stub airfoil cross sections spaced at upper and stub airfoil distal ends of the upper and stub airfoil sections respectively,
    the stub and upper airfoil cross sections being spaced apart from the stub and upper electrodes respectively,
    pressing together the upper and stub airfoil cross sections, and
    solid state resistance welding the upper and stub airfoil sections together along the upper and stub airfoil cross sections by passing electrical current across the upper and stub airfoil cross sections while the upper and stub airfoil cross sections are being pressed together, wherein the solid state resistance welding includes applying the electrical current to the electrodes during the solid state resistance welding.

2. The method as claimed in claim 1 further comprising:
    the stub airfoil section extending outwardly from an airfoil carrier and the method being performed while the stub airfoil section is attached to the airfoil carrier.

3. The method as claimed in claim 2 further comprising:
    leaving a stub airfoil portion of the stub airfoil section protruding out from the pressure and suction side stub electrodes when placing the stub airfoil section between pressure and suction side stub electrodes before the aligning,
    leaving an upper airfoil portion of the upper airfoil section protruding out from the pressure and suction side upper airfoil electrodes when placing the stub airfoil section between pressure and suction side upper airfoil electrodes before the aligning, and
    wrapping copper braiding around the stub airfoil distal end at least up to and not including the stub airfoil portion and wrapping copper braiding around the upper airfoil distal ends at least up to and not including the upper airfoil portion before placing the upper airfoil section between pressure and suction side upper airfoil electrodes.

4. The method as claimed in claim 3 further comprising:
    simultaneously coining the stub and upper airfoil portions to decrease or eliminate offsets between leading and trailing edges of the upper and stub airfoil cross sections for an airfoil having twist after placing the stub airfoil section between pressure and suction side stub electrodes and before the solid state resistance welding.

5. The method as claimed in claim 4, wherein the coining includes pressing the stub and upper airfoil portions between pressure and suction side coining dies.

6. The method as claimed in claim 2, wherein the airfoil carrier is an annular rim of a gas turbine engine rotor disk or a gas turbine engine drum or a gas turbine engine blade platform.

7. The method as claimed in claim 1 further comprising:
    leaving a stub airfoil portion of the stub airfoil section protruding out from the pressure and suction side stub electrodes when placing the stub airfoil section between pressure and suction side stub electrodes before the aligning, and
    leaving an upper airfoil portion of the upper airfoil section protruding out from the pressure and suction side upper airfoil electrodes when placing the stub airfoil section between pressure and suction side upper airfoil electrodes before the aligning.

8. The method as claimed in claim 7 further comprising:
    simultaneously coining the stub and upper airfoil portions to decrease or eliminate offsets between leading and trailing edges of the upper and stub airfoil cross sections for an airfoil having twist after placing the stub airfoil section between pressure and suction side stub electrodes and before the solid state resistance welding.

9. The method as claimed in claim 8, wherein the coining includes pressing the stub and upper airfoil portions between pressure and suction side coining dies.

10. The method as claimed in claim 7 further comprising:
    wrapping copper braiding around the stub airfoil distal end at least up to and not including the stub airfoil portion before placing the stub airfoil section between pressure and suction side stub electrodes, and
    wrapping copper braiding around the upper airfoil distal ends at least up to and not including the upper airfoil portion before placing the upper airfoil section between pressure and suction side upper airfoil electrodes.

11. The method as claimed in claim 1 further comprising:
    leaving a stub airfoil portion of the stub airfoil section protruding out from the pressure and suction side stub electrodes when placing the stub airfoil section between pressure and suction side stub electrodes before the aligning, and
    leaving an upper airfoil portion of the upper airfoil section protruding out from the pressure and suction side upper airfoil electrodes when placing the stub airfoil section between pressure and suction side upper airfoil electrodes before the aligning.

12. The method as claimed in claim 11 further comprising:
    wrapping copper braiding around the stub airfoil distal end at least up to and not including the stub airfoil portion before placing the stub airfoil section between pressure and suction side stub electrodes, and
    wrapping copper braiding around the upper airfoil distal ends at least up to and not including the upper airfoil portion before placing the upper airfoil section between pressure and suction side upper airfoil electrodes.

13. The method as claimed in claim 1 further comprising:
    wrapping copper braiding around the stub airfoil distal end before placing the stub airfoil section between pressure and suction side stub electrodes, and
    wrapping copper braiding around the upper airfoil distal ends before placing the upper airfoil section between pressure and suction side upper airfoil electrodes.

14. The method as claimed in claim 1 further comprising:
using a first set of copper pressure and suction side airfoil compliant electrode inserts inset in the pressure and suction side stub electrodes respectively,
using a second set of copper pressure and suction side airfoil compliant electrode inserts inset in the pressure and suction side upper airfoil electrodes respectively,
the first and second sets of the pressure and suction side airfoil compliant electrode inserts conforming to the airfoil shapes of the upper and stub airfoil distal ends respectively, and
the first and second sets of the pressure and suction side airfoil compliant electrode inserts extending at least up to and not including the upper airfoil portion and extending at least up to and not including the stub airfoil portion respectively.

15. The method for repairing a damaged airfoil comprising:
forming a stub airfoil section having stub airfoil pressure and suction sides from a damaged airfoil by cutting away a damaged airfoil section from the damaged airfoil,
placing the stub airfoil section with the stub airfoil pressure and suction sides between pressure and suction side stub electrodes respectively,
placing an upper airfoil section having upper airfoil pressure and suction sides between pressure and suction side upper airfoil electrodes respectively,
aligning the upper airfoil section with the stub airfoil section wherein the stub airfoil section extends outwardly from an airfoil carrier,
the aligning including aligning upper and stub airfoil cross sections at upper and stub airfoil distal ends of the upper and stub airfoil sections respectively,
pressing together the upper and stub airfoil cross sections,
solid state resistance welding the upper and stub airfoil sections together along the upper and stub airfoil cross sections by passing electrical current across the upper and stub airfoil cross sections while the upper and stub airfoil cross sections are being pressed together, wherein the solid state resistance welding includes applying the electrical current to the electrodes during the solid state resistance welding.

16. The method as claimed in claim 15, wherein the airfoil carrier is an annular rim of a gas turbine engine rotor disk or a gas turbine engine drum or a gas turbine engine blade platform.

17. The method as claimed in claim 16, wherein the damaged airfoil section is cut away from the damaged airfoil along a cut line extending between leading and trailing edges of the damaged airfoil.

18. The method as claimed in claim 17 further comprising:
leaving a stub airfoil portion of the stub airfoil section protruding out from the pressure and suction side stub electrodes when placing the stub airfoil section between pressure and suction side stub electrodes before the aligning,
leaving an upper airfoil portion of the upper airfoil section protruding out from the pressure and suction side upper airfoil electrodes when placing the stub airfoil section between pressure and suction side upper airfoil electrodes before the aligning, and
wrapping copper braiding around the stub airfoil distal end at least up to and not including the stub airfoil portion, and
wrapping copper braiding around the upper airfoil distal ends at least up to and not including the upper airfoil portion before placing the upper airfoil section between pressure and suction side upper airfoil electrodes.

19. The method as claimed in claim 18 further comprising:
simultaneously coining the stub and upper airfoil portions to decrease or eliminate offsets between leading and trailing edges of the upper and stub airfoil cross sections for an airfoil having twist after placing the stub airfoil section between pressure and suction side stub electrodes and before the solid state resistance welding.

20. The method as claimed in claim 19, wherein the coining includes pressing the stub and upper airfoil portions between pressure and suction side coining dies.

21. A method for bonding gas turbine engine airfoil sections to form an airfoil, the method comprising:
placing a stub airfoil section between pressure and suction side stub electrodes and placing an upper airfoil section between pressure and suction side upper airfoil electrodes,
aligning the upper airfoil section having upper airfoil pressure and suction sides with the stub airfoil section having stub airfoil pressure and suction sides,
the aligning including aligning upper and stub airfoil cross sections at upper and stub airfoil distal ends of the upper and stub airfoil sections respectively,
pressing together the upper and stub airfoil cross sections,
clamping the upper airfoil section between the pressure and suction side upper airfoil electrodes,
clamping the stub airfoil section between the stub airfoil pressure and suction sides, and
solid state resistance welding the upper and stub airfoil sections together along the upper and stub airfoil cross sections by applying electrical current to the electrodes and passing the electrical current across the upper and stub airfoil cross sections while the upper and stub airfoil cross sections are being pressed together and while the upper airfoil section is clamped between the pressure and suction side upper airfoil electrodes and the stub airfoil section is clamped between the stub airfoil pressure and suction sides.

22. The method as claimed in claim 21 further comprising:
leaving a stub airfoil portion of the stub airfoil section protruding out from the pressure and suction side stub electrodes when placing the stub airfoil section between pressure and suction side stub electrodes before the aligning, and
leaving an upper airfoil portion of the upper airfoil section protruding out from the pressure and suction side upper airfoil electrodes when placing the stub airfoil section between pressure and suction side upper airfoil electrodes before the aligning.

23. The method as claimed in claim 22 further comprising:
simultaneously coining the stub and upper airfoil portions to decrease or eliminate offsets between leading and trailing edges of the upper and stub airfoil cross sections for an airfoil having twist after placing the stub airfoil section between pressure and suction side stub electrodes and before the solid state resistance welding.

24. The method as claimed in claim 23, wherein the coining includes pressing the stub and upper airfoil portions between pressure and suction side coining dies.

25. The method as claimed in claim 22 further comprising:
wrapping copper braiding around the stub airfoil distal end at least up to and not including the stub airfoil portion before placing the stub airfoil section between pressure and suction side stub electrodes, and
wrapping copper braiding around the upper airfoil distal ends at least up to and not including the upper airfoil portion before placing the upper airfoil section between pressure and suction side upper airfoil electrodes.

26. The method as claimed in claim 21 further comprising:
wrapping copper braiding around the stub airfoil distal end before placing the stub airfoil section between pressure and suction side stub electrodes, and
wrapping copper braiding around the upper airfoil distal ends before placing the upper airfoil section between pressure and suction side upper airfoil electrodes.

27. The method as claimed in claim 26 further comprising:
leaving a stub airfoil portion of the stub airfoil section protruding out from the pressure and suction side stub electrodes when placing the stub airfoil section between pressure and suction side stub electrodes before the aligning, and
leaving an upper airfoil portion of the upper airfoil section protruding out from the pressure and suction side upper airfoil electrodes when placing the stub airfoil section between pressure and suction side upper airfoil electrodes before the aligning.

28. The method as claimed in claim 27, wherein the wrappings include wrapping copper braiding around the stub airfoil distal end at least up to and not including the stub airfoil portion and wrapping copper braiding around the upper airfoil distal ends at least up to and not including the upper airfoil portion before placing the upper airfoil section between pressure and suction side upper airfoil electrodes.

29. The method as claimed in claim 21 further comprising:
leaving a stub airfoil portion of the stub airfoil section protruding out from the pressure and suction side stub electrodes when placing the stub airfoil section between pressure and suction side stub electrodes before the aligning,
leaving an upper airfoil portion of the upper airfoil section protruding out from the pressure and suction side upper airfoil electrodes when placing the stub airfoil section between pressure and suction side upper airfoil electrodes before the aligning, and
wrapping copper braiding around the stub airfoil distal end at least up to and not including the stub airfoil portion and wrapping copper braiding around the upper airfoil distal ends at least up to and not including the upper airfoil portion before placing the upper airfoil section between pressure and suction side upper airfoil electrodes.

30. The method as claimed in claim 29 further comprising:
simultaneously coining the stub and upper airfoil portions to decrease or eliminate offsets between leading and trailing edges of the upper and stub airfoil cross sections for an airfoil having twist after placing the stub airfoil section between pressure and suction side stub electrodes and before the solid state resistance welding.

31. The method as claimed in claim 30, wherein the coining includes pressing the stub and upper airfoil portions between pressure and suction side coining dies.

32. The method as claimed in claim 21 further comprising:
the stub airfoil section extending outwardly from an airfoil carrier and the method being performed while the stub airfoil section is attached to the airfoil carrier.

33. The method as claimed in claim 32, wherein the airfoil carrier is an annular rim of a gas turbine engine rotor disk or a gas turbine engine drum or a gas turbine engine blade platform.

* * * * *